United States Patent
Paul et al.

(10) Patent No.: US 9,224,058 B2
(45) Date of Patent: Dec. 29, 2015

(54) DATA AUGMENTATION METHOD AND SYSTEM FOR IMPROVED AUTOMATIC LICENSE PLATE RECOGNITION

(71) Applicant: Xerox Corporation, Norwalk, CT (US)

(72) Inventors: Peter Paul, Webster, NY (US); Vladimir Kozitsky, Rochester, NY (US); Aaron Michael Burry, Ontario, NY (US); Martin Edward Hoover, Rochester, NY (US); Mark Cantelli, Germantown, MD (US)

(73) Assignee: Xerox Corporation, Norwalk, CT (US)

( * ) Notice: Subject to any disclaimer, the term of this patent is extended or adjusted under 35 U.S.C. 154(b) by 65 days.

(21) Appl. No.: 13/857,657

(22) Filed: Apr. 5, 2013

(65) Prior Publication Data

US 2014/0301606 A1 Oct. 9, 2014

(51) Int. Cl.
*G06K 9/00* (2006.01)
*G06K 9/20* (2006.01)
*G06K 9/32* (2006.01)

(52) U.S. Cl.
CPC ............ *G06K 9/2027* (2013.01); *G06K 9/3258* (2013.01); *G06K 2209/15* (2013.01)

(58) Field of Classification Search
None
See application file for complete search history.

(56) References Cited

U.S. PATENT DOCUMENTS

| | | | | |
|---|---|---|---|---|
| 4,878,248 A * | 10/1989 | Shyu | ........................ | G06K 9/32 382/105 |
| 4,958,064 A * | 9/1990 | Kirkpatrick | .......... | G06K 7/1092 235/384 |
| 6,339,651 B1 * | 1/2002 | Tian | ........................ | G06K 9/344 340/10.1 |
| 6,457,651 B2 | 10/2002 | Paul et al. | | |
| 6,832,728 B2 | 12/2004 | Kennedy | | |
| 7,119,674 B2 | 10/2006 | Sefton | | |
| 7,825,829 B2 | 11/2010 | Madsen | | |
| 8,251,290 B1 | 8/2012 | Bushman et al. | | |
| 2003/0095688 A1 * | 5/2003 | Kirmuss | ................. | B60R 11/02 382/105 |
| 2005/0173524 A1 | 8/2005 | Schrader | | |
| 2006/0269105 A1 * | 11/2006 | Langlinais | ............... | G03B 7/08 382/105 |
| 2007/0124198 A1 * | 5/2007 | Robinson | ............. | G06Q 20/102 705/13 |
| 2008/0175479 A1 * | 7/2008 | Sefton | .................. | G06K 9/3258 382/182 |
| 2009/0202105 A1 * | 8/2009 | Castro Abrantes | .... | G07B 15/06 382/100 |

(Continued)

OTHER PUBLICATIONS

D.J. Findley, C.M. Cunningham, J.C. Chang, K.A. Hovey, and M.A. Corwin "Effects of License Plate Attributes on Automatic License Plate Recognition" Oct. 10, 2012, 92nd Annual Meeting of the Transportation Research Board.*

(Continued)

*Primary Examiner* — Matthew Bella
*Assistant Examiner* — Soo Shin
(74) *Attorney, Agent, or Firm* — Kermit D. Lopez; Kevin Soules; Luis M. Ortiz

(57) ABSTRACT

Methods, systems, and processor-readable media for data augmentation utilized in an automatic license plate recognition engine. A machine-readable code can be associated with an automatic license plate recognition engine. The machine-readable code can be configured to define parameters that drive processing within the automatic license plate recognition engine to produce recognition results thereof and enhance a machine readability of a license plate recognized and analyzed via the automatic license plate recognition engine.

20 Claims, 8 Drawing Sheets

(56) References Cited

U.S. PATENT DOCUMENTS

| | | | | |
|---|---|---|---|---|
| 2010/0151213 | A1* | 6/2010 | Smithson | B60R 13/10 428/195.1 |
| 2011/0084126 | A1* | 4/2011 | Fleming | G09F 3/0297 235/375 |
| 2011/0240749 | A1* | 10/2011 | Naddor | G06K 19/06075 235/494 |
| 2012/0148105 | A1* | 6/2012 | Burry et al. | 382/105 |
| 2012/0155712 | A1 | 6/2012 | Paul et al. | |
| 2012/0263352 | A1 | 10/2012 | Fan et al. | |
| 2013/0028481 | A1 | 1/2013 | Wu | |
| 2013/0032634 | A1 | 2/2013 | McKirdy | |
| 2013/0216101 | A1* | 8/2013 | Wu | G06K 9/00 382/105 |
| 2014/0212049 | A1* | 7/2014 | Honda | G06T 7/0085 382/199 |

OTHER PUBLICATIONS

D.J. Findley (presentation slides), "Effects of License Plate Attributes on Automatic License Plate Recognition" Aug. 21, 2012, 2012 AAMVA Annual International Conference.*

Y. Zhang and C. Zhang "A new algorithm for character segmentation of license plate", Proc. IEEE Intell. Veh. Symp., pp. 106-109 2003.*

C. Anagnostopoulos, I. Anagnostopoulos, E. Kayafas and V. Loumos "A license plate recognition system for intelligent transportation system applications", IEEE Trans. Intell. Transp. Syst., vol. 7, No. 3, pp. 377-392 2006.*

D J Findley (presentation slides), "Effects of License Plate Attributes on Automatic License Plate Recognition" Aug. 21, 2012, 2012 AAMVA Annual International Conference. (Ref. provided with the pre-interview communication).*

D.J. Findley, C.M. Cunningham, J.C. Chang, K.A. Hovey, and M.A. Corwin "Effects of License Plate Attributes on Automatic License Plate Recognition" Oct. 10, 2012, 92nd Annual Meeting of the Transportation Research Board. (Ref. provided with the pre-interview communication).*

D.J. Findley (presentation slides), "Effects of License Plate Attributes on Automatic License Plate Recognition" Aug. 21, 2012, 2012 AAMVA Annual International Conference. (Ref. provided with the pre-interview communication).*

Y. Zhang and C. Zhang "A new algorithm for character segmentation of license plate", Proc. IEEE Intell. Veh. Symp., pp. 106-109 2003. (Ref. provided with the pre-interview communication).*

C. Anagnostopoulos, I. Anagnostopoulos, E. Kayafas and V. Loumos "A license plate recognition system for intelligent transportation system applications", IEEE Trans. Intell. Transp. Syst., vol. 7, No. 3, pp. 377-392 2006. (Ref. provided with the pre-interview communication).*

* cited by examiner

FIG. 2

DATA AUGMENTATION METHOD AND SYSTEM FOR IMPROVED AUTOMATIC LICENSE PLATE RECOGNITION

FIELD OF THE INVENTION

Embodiments are generally related to the field of image-processing. Embodiments are further related to video-based surveillance. Embodiments are additionally related to the field of ALPR (Automatic License Plate Recognition).

BACKGROUND

ALPR systems generally include various image processing and computer vision techniques for: (1) locating a license plate within a scene, (2) segmenting characters on the plate, and (3) performing optical character recognition to determine the character sequence.

In addition, determining the jurisdiction such as the state and plate type is often required. ALPR technologies can be utilized in, for example, electronic tolling, photo enforcement, parking, and other transportation applications where the vehicle identity is required. Performance requirements for ALPR systems are very high and are ever increasing in this competitive market space. Performance errors can be categorized into common failure modes. One prevalent failure mode is referred to as "confused characters". Characters are confused with each other due to image noise. For example, "B" is often confused with "8" and "D" is often confused with "0" in the presence of image blur. In another common failure mode, the license plate frame partially covers the license plate obscuring character strokes such as making a "T" look like a "1" and an "E" look like a "F". Other common failure modes and desired augmenting data are known a priori, as well.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the disclosed embodiments to provide for an improved automatic license plate recognition engine.

It is another aspect of the disclosed embodiments to provide for data augmentation for an automatic license plate recognition engine.

The aforementioned aspects and other objectives and advantages can now be achieved as described herein. Methods, systems, and processor-readable media for data augmentation utilized in an automatic license plate recognition engine are disclosed. In an example embodiment, a machine-readable code can be associated with an automatic license plate recognition engine. The machine-readable code can be configured to define parameters that drive processing within the automatic license plate recognition engine to produce recognition results thereof and enhance a machine readability of a license plate recognized and analyzed via the automatic license plate recognition engine.

In another embodiment, a machine-readable code (e.g., a barcode) can be associated with an automatic license plate recognition engine, wherein the machine-readable code is encoded with information based on a hierarchy, having hierarchy levels with higher levels that are most robust to image noises and lower levels that are less robust with respect to the image noises, but provide more information. The hierarchy is arranged such that the higher levels and the lower levels define parameters that drive processing within the automatic license plate recognition engine to produce recognition results thereof and enhance a machine readability of a license plate recognized and analyzed via the automatic license plate recognition engine.

To address a priori known failure modes and to include augmenting data, a small barcode can be employed, which encodes information that efficiently augments the ALPR system (e.g., an ALPR engine) in performing its task. This can be thought of as adding "differential information" that enhances the machine readability of the overall plate information. Such a barcode can be read using existing license plate reading cameras using either visible light or infrared illumination.

The highest level in the hierarchy can include data indicative of, for example, (1) whether the plate is a standard plate or non-standard plate; (2) whether the plate contains a potential for confusing characters; (3) whether the plate contains characters subject to plate frame occlusion; (4) the State jurisdiction; (5) whether the plate has a logo; (6) whether the plate has stacked characters; (7) the Font used; (8) the best RGB-to-Gray mapping to use; (9) the number of characters on the license plate; and/or (10) whether each character is a letter or a number. Such conditions can define parameters, which drive various processing within the ALPR engine to produce improved recognition results.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates a sample ALPR confusion matrix in accordance with a preferred embodiment;

DETAILED DESCRIPTION

Figure 1:
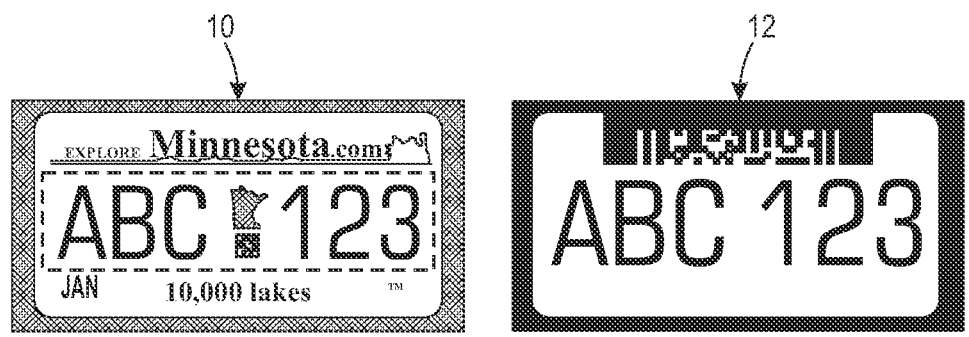
FIG. 1 illustrates a pictorial view of a prior art barcode system readable under infrared illumination, with the left license plate subject to visible light and the right license plate subject to IR light.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Automatic License Plate Recognition (ALPR) systems are generally composed of (A) cameras, illuminators, and vehicle triggers which capture images of vehicles; and (B) image processing and computer vision systems which perform processing which: (1) locates the license plate in a scene; (2) segments the characters within the license plate; and (3) performs optical character recognition (OCR) to determine the character sequence on the license plate. In addition, the State jurisdiction, the plate type, and other information are often required to be determined. ALPR systems are used extensively in transportation systems such as electronic tolling systems and photo enforcement systems (speed enforcement or red light enforcement) where vehicle identity is required.

The performance requirements for ALPR systems are ever increasing. ALPR mistakes can lead to unidentified vehicles causing lost tolling revenue, for example, or worse, can lead to erroneous violations which cause frustration with transportation system patrons who need to go through a process to have the violation vacated. Requirements of 99.5% accuracy and beyond are typically required for current request for proposals put out by transportation agencies.

One approach to improving the machine readability of license plates is to install RFID (Radio-Frequency Identification) transponders on the license plates themselves. Some countries are exploring this option, but it is seen as a much longer-term solution and may be superseded by other technologies as they are developed (Dedicated Short Range Communications, DSCR, for example). Another barrier to RFID transponder adoption on license plates is public acceptance. Even in electronic tolling systems using RFID transponder tags (E-ZPass® in New York, for example), which have clear patron benefit (quicker entrance and exit to the toll road way) adoption is not universal. It is estimated that RFID transponders for tolling would never exceed 70%-80% without government mandate.

Other barriers include RFID transponder life and cost, with transponders requiring replacement at some periodic interval. Since different manufacturers of RFID systems use different frequency bands and different protocols, interoperability problems exist in electronic tolling systems that use RFID transponders as a mechanism to identify vehicles. While standardization could potentially alleviate this problem for license plate mounted RFID transponders, significant federal government action would be required in a domain (license plates) that has traditionally been a responsibility of the states. Even current electronic tolling systems are moving away from using RFID transponders for all of these reasons.

Another approach to improving the machine readability of license plates has been proposed: the use of barcodes. Such a system employs a large barcode that covers existing text on the license plate but is only readable under infrared light. FIG. 1 depicts such a prior art system. On the left side of FIG. 1, a license plate 10 is shown under visible light illumination. License plate 10 looks like a standard license plate to a human observer, such as a police officer who might need to examine the plate to execute their duties. On the right side of the figure is the same license plate 12 illuminated under infrared illumination. Note that a large barcode is prominently visible on the plate.

While this approach seems promising, it has some deficiencies. Most of all is the size of the barcode. In order to fit the amount of information to encode all the license plate information in the barcode, the barcode needs to contain roughly 12-24 bytes of information depending on the level of error correction in the code and the length of the character sequence on the license plate. This is for US plates. For plates that can have much larger character sets, the amount of information would be much higher. In order to contain this amount of information on a barcode that is robustly readable at highway speeds with typical image noises seen by license plate reading cameras and maintaining the use of typical license plate reading cameras (not increasing the cost by increasing the resolution of the cameras, for example), the barcode is required to be physically large.

In the example shown in FIG. 1, the barcode is so large that it obscures the State jurisdiction designation on the plate in the IR image. This is important since for many electronic tolling applications, only one image is taken per plate. The image is taken using IR light so the only image available is the image on the right side of FIG. 1. However, the requirements of the electronic tolling system are that a human may review the imagery to verify a tolling transaction or other violation (e.g., red light violation). A human, viewing only the right side of FIG. 1, would not be able to determine the State jurisdiction of the license plate because the large barcode occludes the State designation. Further, the imagery must provide evidence to assess a toll or issue a violation. This evidence is usually provided to the patron in printed form or as a web link in order for the patron to see that they did indeed make the violation or is correctly paying the toll. Given the image on the right side of FIG. 1, a patron may argue that it is not their vehicle since the State jurisdiction cannot be determined by a person viewing the IR image.

While legislation could possibly be written to alleviate this problem or the plate could be completely redesigned to accommodate the large barcode, these solutions are not straightforward. For example, States use their license plate designs as revenue sources from patrons who are willing to pay a higher fee for a designation such as being a university supporter (for example, a "Texas A&M" license plate with a school mascot on the plate) or supporting some cause ("State Park Supporter" license plate with a special tree logo on the plate). Putting constraints on plate design may impede this revenue source and may not be acceptable.

Another problem with this approach is that it requires infrared cameras and illumination systems. While many existing electronic tolling and other license plate reading systems are IR systems, trends seem to indicate using visible light color based systems to gather enhanced evidence for toll and violation enforcement (color of car, etc.) for new system rollouts. Others have also proposed license plate barcode systems. However, no system we know of describes encoding the kind of information proposed in our invention: information used to aid an ALPR system in reading the characters on the plate and determining other license plate information.

The disclosed embodiments are generally directed toward a technique for determining a small extra set of information that works in conjunction with an ALPR system to provide improved overall machine readability of the plates, and for affixing this small amount of extra information on the license plate using a barcode on a small sticker placed in an unused portion of the plate. Additionally, such embodiments allow the barcode sticker to be read under either visible light or IR illumination.

Since the present inventors have designed and constructed an ALPR system, they are in a position to be are aware of the types of extra information most valuable in order to augment ALPR systems. The disclosed approach, however, does not seek to redundantly encode license plate information. Instead, such an approach, as will be discussed in greater detail herein, seeks to augment an ALPR system with key information that will improve its performance.

The same information that is visually observable on the license plate is not simply repeated into the barcode. Instead, a smaller amount of key information is placed in the barcode to allow for dual reading of the barcode and license plate characters and to provide for the improved accuracy of character recognition while using a small footprint barcode. Some characters are almost always read correctly by the ALPR system; why waste valuable space by encoding them into the barcode? The barcode and ALPR system can work together, not as two completely separate systems redundantly encoding the same information.

Note that in the transportation business, clients are typically state and local governmental agencies that manage roadway systems or parking lots or spaces. Thus, any stickers that would be mounted to license plates would be fully authorized by the governmental agency with full state approval and typically not be subject to any state restriction of sticker placement on license plates. In a scenario in which the disclosed embodiments may be implemented, a governmental agency (e.g., such as E-ZPass® in New York), would physically provide the stickers to their patrons just as they currently provide RF transponders to their patrons. The stickers would simply be an extension of the RFID-based system for agencies that want improved accuracy and to perhaps slowly phase out costly RFID transponders.

The dimensions of a license plate with its barcode can be used to determine the information density while maintaining robust barcode reading using license plate reading cameras at highways speeds in license plate reading geometries. The information density of the license plate barcode system as depicted in the example shown in FIG. 1 can be derived as follows:

A. Barcode Area:
License Plate Area=6 inches×12 inches=72 sq inches
Barcode Area (including border)=1/6 License Plate→12 sq inches
Barcode Area (without border)=1.1 in ×4.6 in→5 sq inches
  B. Information Required:
26 Letters+10 Numbers=36 Characters→(log 36)/(log 2)=5.17 bits
50 States→(log 50)/(log 2)=5.64 bits
32 Plate Types→(log 32)/(log 2)=5 bits
7 Characters+1 State+1 Plate Type→(7×5.17 bits)+5.64 bits+5 bits=Approx 50 bits
w/Error Detection & Correction→Factor of 2
  →Approx 100 bits
  C. Information Contained in 3M Barcode
Analysis of Barcode Image→5 rows×24 cols→120 bits
  D. Information Density
Including Border: 120 bits/12 sq inches=10 bits/sq inch
Without Border: 120 bits/5 sq inches=24 bits/sq inch Note that a simple enumeration of the data required to be in the barcode shows that approximately 100 bits are required to be in the barcode as shown in section B above. Examination of the barcode reveals 120 bits as shown in section C above, which is roughly consistent with the simple enumeration calculation. From FIG. 1, the barcode seems to have very large border regions including what looks like barcode clocking lines to the left and to the right of the barcode. Optimization of the border region and barcode clocking lines may reduce the non-information carrying border region. With this in mind the information density for robust barcode reading on license plates seems to be in the range of 10-24 bits/sq inch. This range of barcode spatial information density is used in the remainder of this invention disclosure. To avoid any potential confusion, note that the current invention is aimed at reducing the total required information contained in the barcode, but for reference will assume the level of information density within the barcode.

Information can be encoded in the barcode based on specific known failure modes of an ALPR system. In this way a small amount of information is provided on the barcode sticker, which will aid the ALPR system in its operation. The small amount of additional information can be stored in a relatively small barcode. The size of the required barcode will be determined using the amount of information stored and the data density for robust reading on license plates. The specific failure modes or added information can include, for example:
A1: Plate Contains Confusing Characters
A2: Plate Contains Characters Susceptible to Frame Occlusion
A3: Standard or Non-Standard Plate
A4: Plate Contains Logo or Not
A5: Plate Contains Stacked Characters or Not
A6: State Jurisdiction
A7: Font Used
A8: Best RGB-to-Gray Mapping to use Confusing Characters are those characters which can easily be confused with each other, especially under typical license plate reading noises such as blur and geometric distortions. These include mistaking a "B" for an "8", a "D" for a "0", a "Y" mistaken for a "V", and a "4" for an "A". Of course, this is very font dependent. Note that a "B" is very similar to an "8" plus some higher spatial frequency terms. If these higher spatial frequency terms are removed due to blur, then a "B" is confused with an "8". Note that typically an "8" is not mistaken for a "B" and a "0" is not typically mistaken for a "D" (i.e., the confusion is really "one-way").

Figure 2:
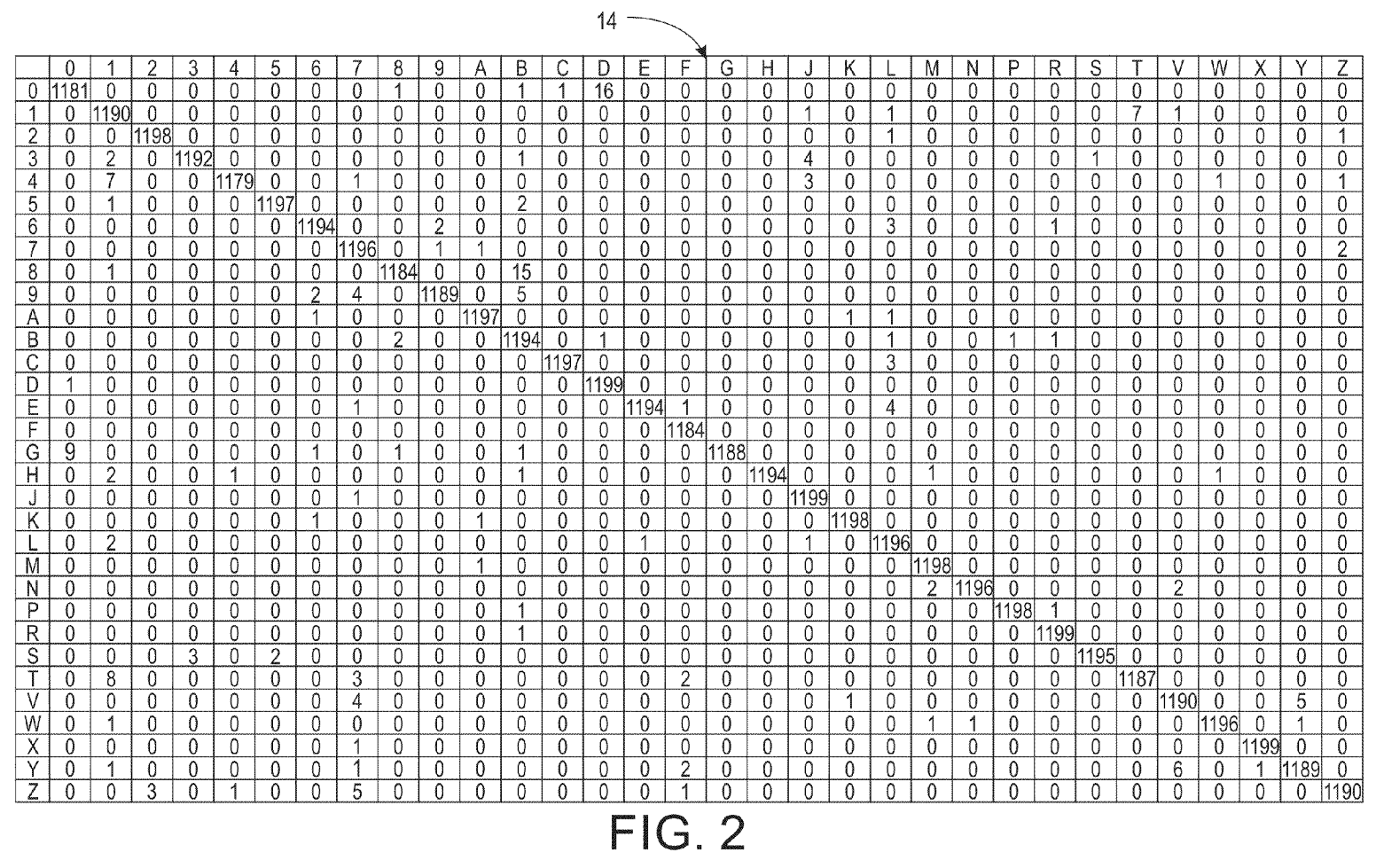

FIG. 2 illustrates an example "Confusion Matrix" 14, which is a matrix showing which characters get mistaken for other characters in the ALPR system. Such an example Confusion Matrix 14 can be obtained from a license plate reading system with respect to en real license plate data taken from a tolling system. The top row in the example Confusion Matrix indicated in FIG. 2 labels the correct character, while the first column labels the recognized characters. Note that the matrix is strongly diagonal which means that the ALPR system does not make very many mistakes. The Confusion Matrix very explicitly shows the failure modes and challenging characters of the ALPR system. By simply providing 1-bit of information to the ALPR system, which encodes whether the plate has characters that are susceptible to the confusing characters failure mode, the ALPR system can reduce these specific mistakes. In one embodiment, for plates that have more than one confusing character, more than 1-bit is used to encode the locations of these characters as well.

Characters susceptible to frame occlusion include a "T" whose top stroke may be occluded by the plate frame and then may be mistaken for a "1". 1-bit is required for this purpose.

A Non-Standard plate is a plate that does not conform to a general standard for a particular state. This includes, for example, vanity plates. Vanity plates are often not required to be read by license plate reading systems. This is often written in the RFP (Request for Proposal) and into the eventual contract with the client agency. 1-bit is required for this purpose.

Logos are typically used to delimit letters and/or number on the left side of the plate from those on the right side of the plate for aesthetic purposes. A state logo, for example, is depicted in the middle of the license plate 10 of FIG. 1. Since Logos are in the same plate region as characters to be read, they can cause confusion in character segmentation and character recognition. 1-bit is required for this purpose.

Stacked characters are a set of smaller characters stacked on top of each other where the stack is located in a typical location where the license plate characters are expected to be. Since the stack is in this location, they can cause confusion in character segmentation and in character recognition. 1-bit is required for this purpose.

State jurisdiction is the state that the plate is from. Typically at most, 6-7 states are required to be identified. Any other state outside of this 6-7 state set can be grouped together. Thus 8 values are possible, which requires 3-bits.

The font used is the font used to write the characters on the license plate. Since the state is encoded, a smaller number of fonts need to be encoded. Assume 4 fonts (which is really 4 per state, since state is being encoded), which requires 2-bits.

Best RGB-to-Gray mapping is a hint as to how to process the RGB image in order to use the ALPR engine. While the full color image can be used, for some cases one color plane provides the best contrast. However, that one color plane may be different for different states or even different plate types within a state. Thus 4 values are required to state whether the best encoding is R-to-Gray, G-to-Gray, B-to-Gray, or (R+G+B)-to-Gray. This requires 2-bits.

Figure 3:
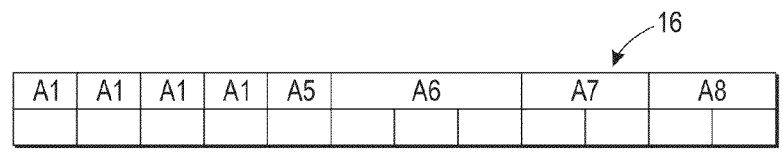
FIG. 3 illustrates a sample ALPR augmentation data bit format in accordance with a preferred embodiment.

FIG. 3 depicts the ALPR augmentation data bit format to encode the extra information used to improve the performance of the ALPR engine. For example, a bit sequence of 01010-010-01-10 would indicate: No Confusing Characters, Plate Occlusion Susceptibility, Standard Plate, Logo Present, No Stacked Characters, State Number 2, Font Number 1, and use the B-to-Gray mapping for color images. The ALPR engine can use these hints to set processing parameters in the processing engine in order to improve the ALPR accuracy.

This data and format requires 12 bits. Assuming that error detection and correction coding doubles the number of bits required yields a total of 24 bits to be encoded in the barcode. With the barcode data density determined in Section 2 of 12-24 bits/sq in, this augmentation data requires 1-2 sq in of plate area for the barcode sticker. Note that this is much smaller than the barcode depicted in the example of FIG. 1, which requires up to 12 sq in of plate area. Furthermore, since this information is just the right extra information to improve the accuracy of the ALPR system, it may, in fact, provide a better overall machine readability of the plate compared to a system that attempts to redundantly encode all the information contained in the license plate on to the barcode.

Note that this is simply one embodiment. Of course, more or fewer bits could be allocated to the different fields of the Augmentation Data in order to encode more or less specific information. For example, the sequence or location of multiple confusing characters could be encoded, or more or fewer bits could be allocated to encode more or fewer states. Furthermore, additional fields could be defined to encode, for example, the plate type, positive or negative text, or other information in order to aid the ALPR system. An additional field for the number of characters on the plate may be very useful. For 1 to 8 characters, this would require 3 bits. However, to further reduce the number of bits required for encoding the number of characters on the plate, a baseline number of characters plus offset can be used. If the baseline number of characters is 4, then only 2 bits can be used to encode a value from 4 to 7+ for the number of characters on the plate. Another additional field could be used to encode whether a letter or a number is at a particular location in the character sequence. For an 8 character field this would require 3 bits.

In another embodiment, the example augmentation data 16 depicted in FIG. 3 would be at the highest level in a data hierarchy. More details would be at a lower level in a data hierarchy and that information could be stored in the same barcode areas, but require higher resolution cameras in order to read the data at the lower levels in the hierarchy. In this way, standard license plate reading cameras as currently deployed in the field can read the standard density information at the highest level in the data hierarchy (such as the data depicted in FIG. 3), while the more detailed information would require higher resolution cameras. The barcode would thus have some level of "future-proof" as higher resolution cameras get rolled out into transportation applications. The more detailed information could include, for example, character locations, a larger number of state designations, and plate type designations.

In another embodiment, the augmentation data can be updated over time based on the current operation of the overall ALPR system and real statistics of the deployment of the ALPR system. New stickers would then be mailed out to the patrons to affix to their license plates. Note that in many states, inspection or registration stickers are put on license plates on a periodic basis, often yearly, so patrons are familiar with affixing new stickers on their license plates periodically.

Figure 4:
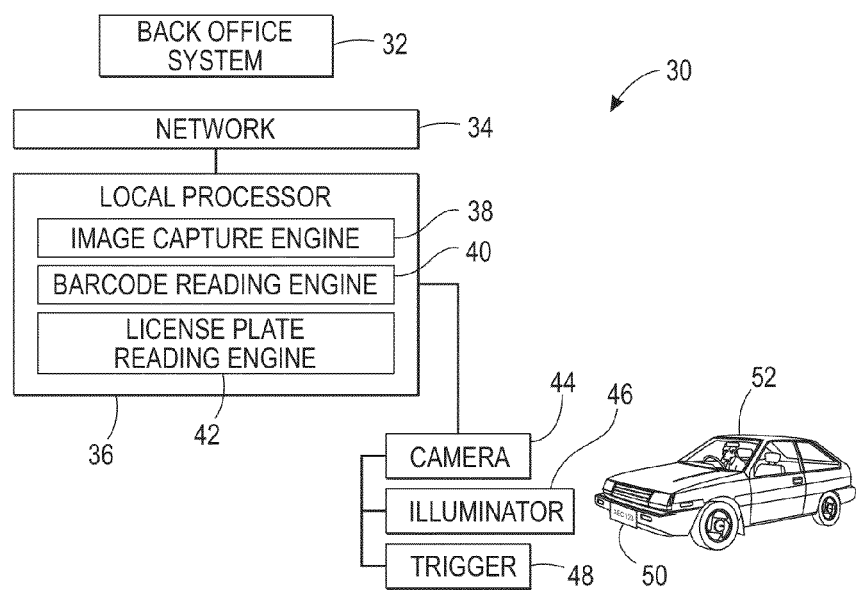
FIG. 4 illustrates a high-level block diagram of an ALPR system that can be implemented in accordance with a preferred embodiment.

FIG. 4 illustrates a high-level system diagram of an ALPR system 30 that can be implemented in accordance with a preferred embodiment. The system 30 depicted in FIG. 4 includes a vehicle 52 with a license plate 50, which has a barcode sticker containing augmentation data for an automatic license plate reading engine, along with a trigger 48, a camera 44, and an illuminator 46 for capturing an image. System 30 further includes a local processor 36 that includes an image capture engine 38, a barcode reading engine 40, and a license plate reading engine 42. System 30 can further include a network 34 (e.g., a local wireless network, the Internet, cellular communications network, other data network, etc.), and a back office system 32 for processing trans-actions and managing patron accounts. The local processor 36 can communicate with the back office system 32 via the network 34.

In FIG. 4, the license plate 50 is depicted located on the front of the vehicle 52, but the license plate 50 can be located on the rear of the vehicle 52 as well. In one scenario, the vehicle 52 enters a license plate reading zone which contains a trigger device 48 which controls an illuminator 46 which illuminates the license plate region of the vehicle 52, and a camera 44 which images the license plate 50 on the vehicle 52. The camera 44 is connected to a local processor unit 38, which contains an image capture engine 38, a barcode reading engine 40, and the license plate reading engine 42.

The image capture engine 38 controls the trigger 48, illuminator 46, and camera 44 in order to properly image the vehicle 52 and the license plate 50. The barcode reading engine 40 locates the barcode region in the captured image and decodes the barcode in order to determine a parameter set which is sent to the license plate reading engine 38. The license plate reading engine 38 uses the parameter set determined by the barcode reading engine 40 to determine the correct character sequence and state jurisdiction indicated on the license plate 50 in order to determine a unique identifier for the vehicle 52.

The license plate 50 and state jurisdiction data can then be sent by the local processor 36 over the network 34 to the back office system 32. The back office system 32 processes the license plate and state jurisdiction data and assesses a toll or otherwise interacts with a patron account or takes other transportation application specific actions.

Figure 5:
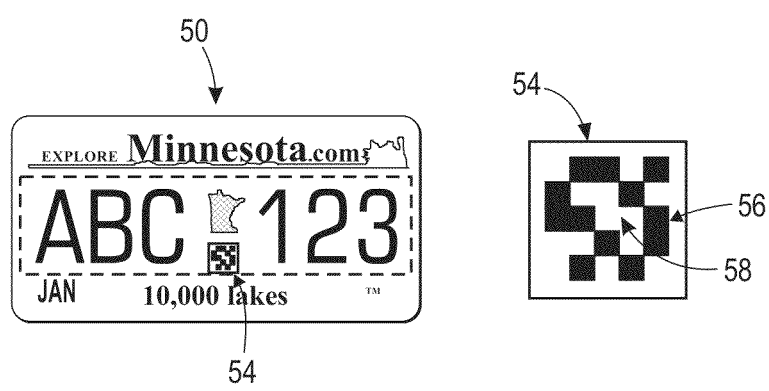
FIG. 5 illustrates a pictorial view of a license plate with a license plate sticker that can include a barcode and ALPR augmentation data, in accordance with a preferred embodiment.

FIG. 5 illustrates a pictorial view of a license plate 50 with a license plate sticker 54 that can include a barcode 56 and ALPR augmentation data 58, in accordance with a preferred embodiment. The left side of FIG. 5 depicts the sticker 54, which contains the barcode 56 on the license plate 50 in a location that does not detract from the visual observation of the license plate 50. The right side of FIG. 5 depicts the actual sticker 54 with the barcode 56. The ALPR augmentation data 58 is depicted as the data contained by the barcode 56. The configuration shown in FIG. 5 thus uses data within the barcode 56 that is derived from that information which best helps the ALPR improve its performance.

Note that the disclosed embodiments can be implemented in different scenarios. For example, the license plate sticker 54 does not necessarily need to be directly located on the license plate 50. In some situations, the sticker 54 can be still be located on the rear of the vehicle 52 somewhere, for example, on the back bumper, and remain within the field of view of the ALPR camera 44. An alternate location for the sticker 54 would be on a license plate frame/holder. An alternative to the sticker is encoding of the barcode 56 on a license plate frame/holder through painting or other marking or through etching. Tolling agencies, for example, could provide plate frames rather than stickers as a patron option.

Figure 6:
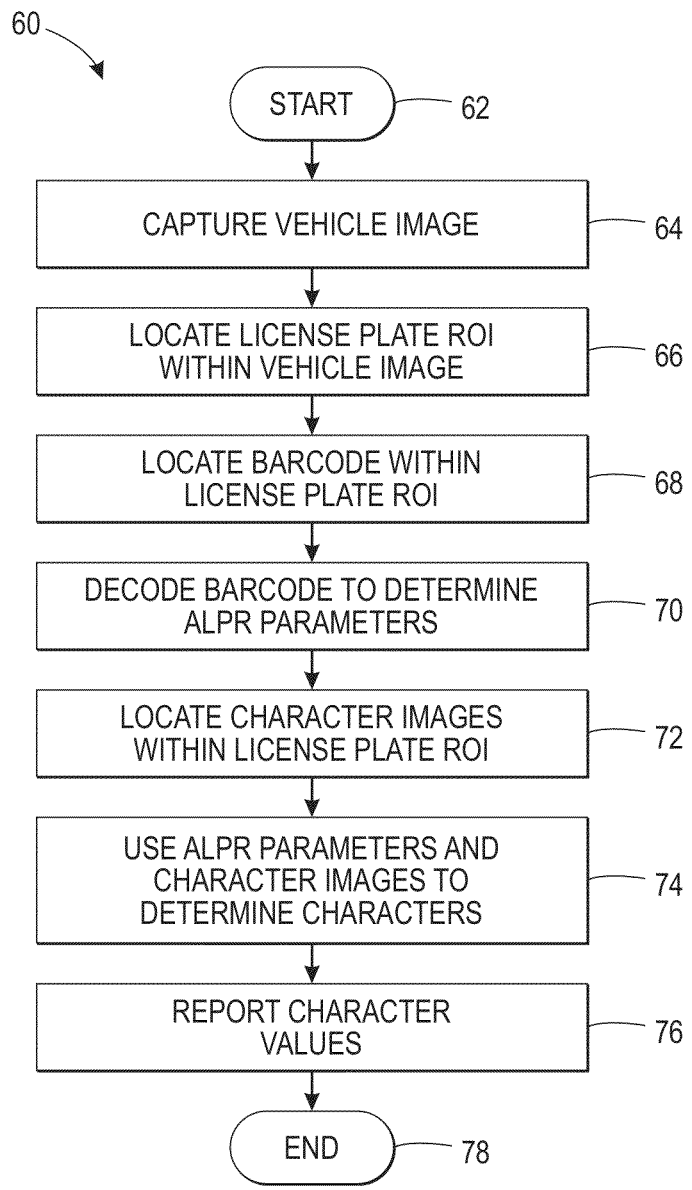
FIG. 6 illustrates a high-level flow chart of operations depicting logical operational steps of a method for providing ALPR augmentation data, in accordance with the disclosed embodiments.

FIG. 6 illustrates a high-level flow chart of operations depicting logical operational steps of a method 60 for providing ALPR augmentation data, in accordance with the disclosed embodiments. As indicated in block 62, the process can begin. Then, as shown at block 64, an operation can be implemented for capturing an image of, for example, vehicle 52 shown in FIG. 4. This can be performed in a standard manner. That is, a vehicle enters the image capture zone. The vehicle triggers a sensor, which could be a ground loop, or other sensor located on or in the roadway surface, or it could be a laser triggering mechanism, or it could be a video based triggering mechanism. The trigger sensor then activates an illuminator unit, which illuminates the license plate on the vehicle. The trigger sensor also activates a camera, which takes a digital picture of the vehicle. Other standard methods of capturing an image of a vehicle and its license plate are also possible, including using continuous video capture and extracting video frames that contain vehicles and license plates.

As depicted next at block 66, image processing and computer vision techniques can be employed to locate the license plate region of interest (ROI) within the vehicle image. This can be performed in ALPR systems, for example, using a standard shape and size of the license plate as cues.

Thereafter, as shown at block 68, the barcode image can be located within the license plate ROI. This can be accomplished using a priori knowledge of the location of the barcode within the license plate ROI using edge references and known pixel-to-edge distance relationships. The location of the barcode can be further determined using correlation template matching and/or more advanced machine learning techniques.

Next, as shown at block 70, the barcode data can be decoded. The barcode encoding scheme can be a known 1D or 2D scheme such as Code 39, Code 128, Data Matrix, QR Codes, PDF417, Data Glyphs, or others. The barcode can be decoded to produce a set of ALPR parameters, as shown in FIG. 3, for example.

Figure 7:
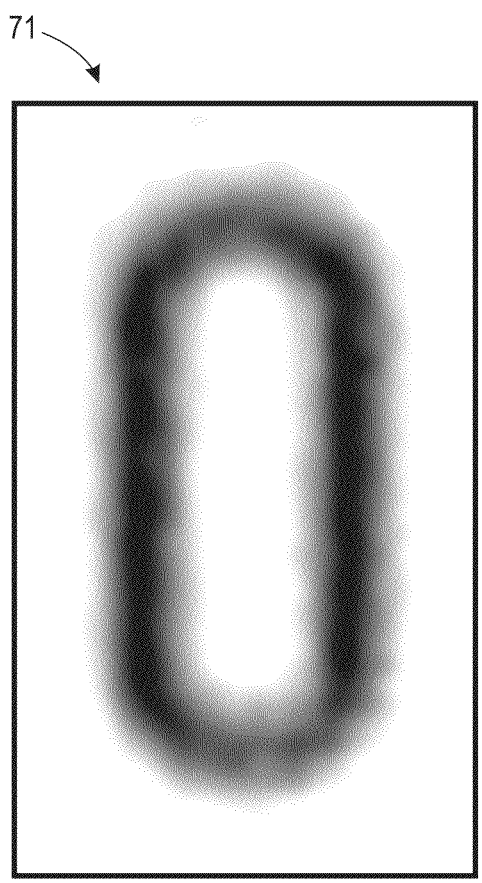
FIG. 7 illustrates an example character image in accordance with a preferred embodiment.

Thereafter, as depicted at block 72, the character images can be segmented from the license plate ROI image. Next, as illustrated at block 74, the ALPR parameters and the character images can be employed to determine the characters on the license plate. For example, if the image 71 shown in FIG. 7 is captured as one of the character images and the "Confused Character" Bit, A1, was set in the ALPR parameter set as read from the barcode, then the character would be declared a "D", if the A1 bit is not set then the character would be declared a "0". Note that in an alternate embodiment the confidence outputs of the character recognition engine could be used in conjunction with the ALPR parameters in the declaration of character values.

Thereafter, as depicted at block 76, the character values are reported. The method then processes the next vehicle image and/or the process can terminate, as shown at block 78.

Figure 8:
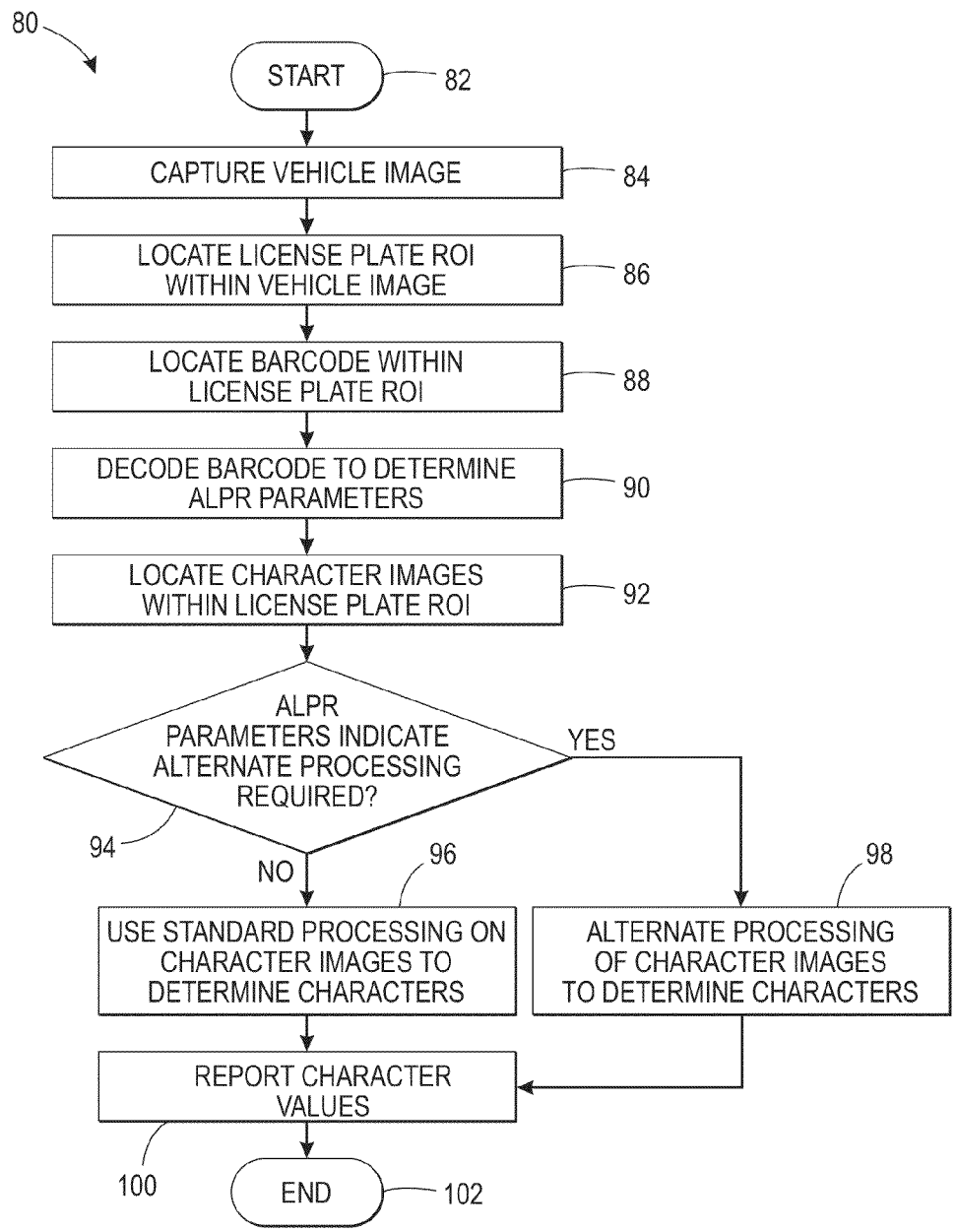
FIG. 8 illustrates a high-level chart of operations depicting logical operational steps of an alternative method for providing ALPR augmentation data, in accordance with an alternative embodiment.

FIG. 8 illustrates a high-level chart of operations depicting logical operational steps of an alternative method 80 for providing ALPR augmentation data, in accordance with an alternative embodiment. The steps or logical operations of method 80 shown at blocks 84, 86, 88, 90, and 92 in FIG. 8 are respectively analogous to the steps/logical operations of blocks 64, 66, 68, 70, and 72 shown in FIG. 6. FIG. 8 depicts an alternate embodiment where separate character image processing algorithms can be selected based on information located in the barcode data payload.

Following processing of the operation shown at block 92, a test can be performed as depicted at block 94 to determine if ALPR parameters indicate that alternate processing is required. If so, then the operation described at block 98 is processed wherein alternate processing of character images can be performed to determine characters. If not, standard processing of character images to determine characters can be performed, as depicted at block 96. The operation illustrated at block 100 is analogous to the operation of block 76 shown in FIG. 6. The method 80 of FIG. 8 can then terminate, as indicated at block 102.

An example of how the method 80 shown in FIG. 8 can be implemented is where, for example, a bit in the barcode data format indicates that the license plate is susceptible to plate frame occlusion or not. If the bit indicates that the license plate is not susceptible to plate frame occlusion, then "standard processing" as depicted at block 96 is used to determine the characters; if the bit indicates that the license plate is susceptible to plate frame occlusion, then the "alternate processing" indicated at block 98 can used.

This "alternate processing" may be implemented in a form where more detailed analysis is performed at the border regions of the character image including applying a separately trained classifier for characters partially occluded by the plate frame. If the more detailed processing were preformed on every plate, then overall system computational burden would be very high. If the more detailed analysis is only performed when the license plate is susceptible to plate frame occlusions, then more efficient processing takes place since you only do the more computationally burdensome processing when potentially needed. Note that "one bit in the data format" may result in many bits in the eventual barcode due to the application of barcode standards and standard error control coding.

Another example of embodiment 8 includes the case where a bit in the data format includes whether the plate is a "vanity plate" or not. If it is not a vanity plate, then "standard processing" for character images would occur. If it is a vanity plate, then the "alternate processing" may include a completely different license plate identification system such as using "image signature" or "image hashes" and a database look up for known plate-hash pairs.

As will be appreciated by one skilled in the art, the disclosed embodiments can be implemented as a method, data-processing system, or computer program product. Accordingly, the embodiments may take the form of an entire hardware implementation, an entire software embodiment or an embodiment combining software and hardware aspects all generally referred to as a "circuit" or "module" or "engine". For example, an "engine" may be a software module.

Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in, for example, the blocks 62, 64, 66, 68, 70, 72, 74, 76, 78 of method 60 shown in FIG. 6, and blocks 82, 84, 86, 88, 90, 92, 94, 96, 98, 100, 102 of method 80 depicted in FIG. 8 and discussed elsewhere herein.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 9:
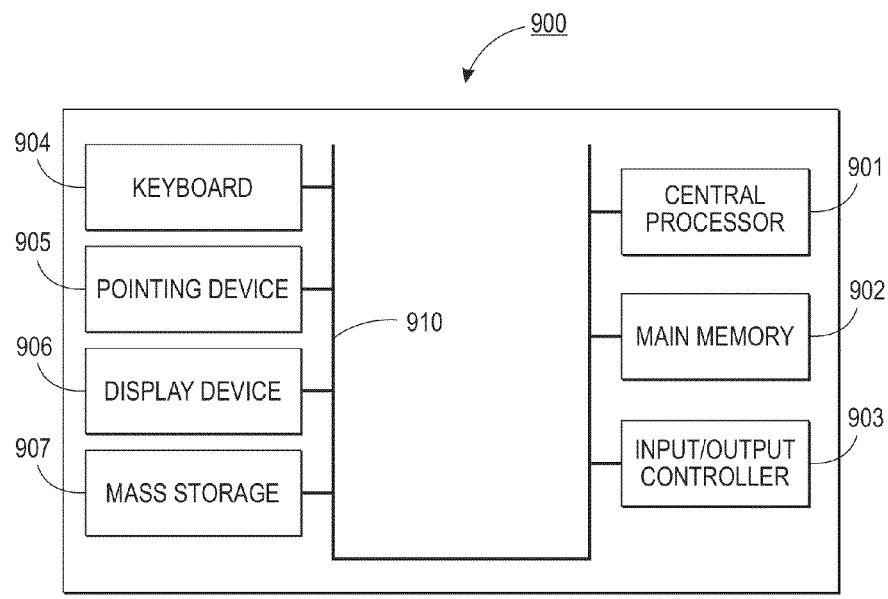
FIG. 9 illustrates a schematic view of a computer system, which can be implemented in accordance with one or more of the disclosed embodiments.
Figure 10:
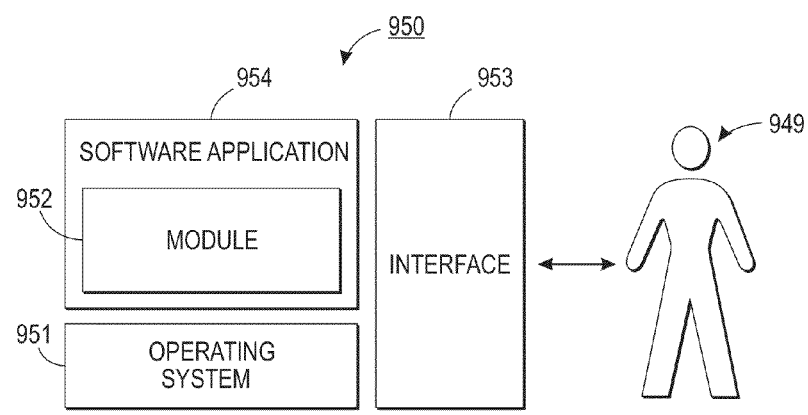
FIG. 10 illustrates a schematic view of a software system including an ALPR module using augmented data, an operating system, and a user interface, in accordance with the disclosed embodiments.

FIGS. 9-10 are provided as exemplary diagrams of data-processing environments in which embodiments of the present invention may be implemented. It should be appreciated that FIG. 9-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 9, the disclosed embodiments may be implemented in the context of a data-processing system 900 that includes, for example, a central processor 901 (or other processors), a main memory 902, an input/output controller 903, and in some embodiments, a USB (Universal Serial Bus) or other appropriate peripheral connection. System 900 can also include a keyboard 904, an input device such as, for example, pointing device 905 (e.g., a mouse, track ball, pen device, etc.), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 or to and from other data-processing devices, components, computers, etc.

It can be appreciated that in some embodiments, the processor 901 may process instructions from the image capture engine 38, the barcode reading engine 40, and the license plate reading engine 42 shown in FIG. 4, and that in fact, the data-processing system 900 may function as the local processor 36, or, for example, the back office system 32 shown in FIG. 4 and further can communicate with, for example, the camera 44, the illuminator 46, the trigger 48, etc., depicted in FIG. 4.

FIG. 10 illustrates a computer software system 950, which may be employed for directing the operation of the data-processing system 900 depicted in FIG. 9. Software application 954, stored in main memory 902 and on mass storage 907, generally can include and/or can be associated with a kernel or operating system 951 and a shell or interface 953. One or more application programs, such as module(s) 952, may be "loaded" (i.e., transferred from mass storage 907 into the main memory 902) for execution by the data-processing system 900. In the example shown in FIG. 10, module 952 can be implemented as, for example, a module that performs the logical instructions or operations of methods 60, 80 respectively illustrated in FIGS. 6 and 8, or other appropriate methods/processes. Module 952 can in some embodiments be implemented as an ALPR module that uses augmented data as discussed herein.

The data-processing system 900 can receive user commands and data through user interface 953 accessible by a user 949. These inputs may then be acted upon by the data-processing system 900 in accordance with instructions from operating system 951 and/or software application 954 and any software module(s) 952 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 952) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task such as word processing, accounting, inventory management, etc.

The interface 953 (e.g., a graphical user interface) can serve to display results, whereupon a user may supply additional inputs or terminate a particular session. In some embodiments, operating system 951 and interface 953 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 951 and interface 953. The software application 954 can include, for example, user proximity detection module 952, which can include instructions for carrying out steps or logical operations such as those shown in FIGS. 6 and 8.

FIGS. 9-10 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Based on the foregoing, it can be appreciated that a number of embodiments are disclosed. For example, in one embodiment, a method for data augmentation utilized in an automatic license plate recognition engine can be implemented. Such a method can include, for example, the steps of logical operations of associating a machine-readable code with an automatic license plate recognition engine; and configuring the machine-readable code to define parameters that drive processing within the automatic license plate recognition engine to produce recognition results thereof and enhance a machine readability of a license plate recognized and analyzed via the automatic license plate recognition engine.

In another embodiment, a step or logical operation can be provided for decoding the machine-readable code to determine the parameters. In yet another embodiment, steps or logical operations can be implemented for encoding the machine-readable code with information based on a hierarchy having hierarchy levels with levels that are more robust to image noises and lower levels that are less robust with respect to the image noises; and arranging the hierarchy such that the higher levels and the lower levels further define the parameters that drive the processing within the automatic license plate recognition engine to produce the recognition results thereof and enhance a machine readability of the license plate recognized and analyzed via the automatic license plate recognition engine.

In another embodiment, a system for data augmentation utilized in an automatic license plate recognition engine can be implemented. Such a system can include, for example, a processor, a data bus coupled to the processor, and a computer-usable medium embodying computer program code, the computer-usable medium being coupled to the data bus. Such computer program code can include instructions executable by the processor and configured, for example, for associating a machine-readable code with an automatic license plate recognition engine, and configuring the machine-readable code to define parameters that drive processing within the automatic license plate recognition engine to produce recognition results thereof and enhance a machine readability of a license plate recognized and analyzed via the automatic license plate recognition engine.

In some embodiments, such instructions can be further configured for decoding the machine-readable code to determine the parameters. In other embodiments, such instructions can be further configured for encoding the machine-readable code with information based on a hierarchy having hierarchy levels with levels that are more robust to image noises and lower levels that are less robust with respect to the image noises; and arranging the hierarchy such that the higher levels and the lower levels further define the parameters that drive the processing within the automatic license plate recognition engine to produce the recognition results thereof and enhance a machine readability of the license plate recognized and analyzed via the automatic license plate recognition engine.

In still another embodiment, a processor-readable medium storing computer code representing instructions to cause a process for data augmentation utilized in an automatic license plate recognition engine can be implemented. Such computer code can include computer code to, for example, associate a machine-readable code with an automatic license plate recognition engine, and configure the machine-readable code to define parameters that drive processing within the automatic license plate recognition engine to produce recognition results thereof and enhance a machine readability of a license plate recognized and analyzed via the automatic license plate recognition engine.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for data augmentation utilized in an automatic license plate recognition engine, said method comprising:
    associating a machine-readable code with an automatic license plate recognition engine that reads and recognizes an image of a license plate of a vehicle captured via at least one camera and which communicates with a barcode reading engine, an image capture engine and a processor that communicates electronically with said at least one camera, at least one illuminator and at least one trigger wherein said at least one trigger comprises a ground loop trigger;
    controlling said at least one trigger, said at least one illuminator and said at least one camera via said image capture engine associated with said automatic license plate recognition engine so that said at least one trigger controls said at least one illuminator to illuminate a license plate region of said vehicle;
    configuring said machine-readable code to comprise 24 or fewer bits, which define parameters that drive processing within said automatic license plate recognition engine with respect to said processor to produce recognition results thereof and enhance a machine readability of said image of said license plate captured by said at least one camera and recognized and analyzed via said automatic license plate recognition engine; and
    locating a barcode region in said image of said license plate via said barcode reading engine using a priori knowledge of said location and edge references and known pixel-to-edge distance relationships to determine a parameter set from said parameters, which is sent to said license plate reading engine, which uses said parameter set to determine a correct character sequence and a state jurisdiction to determine a unique identifier for said vehicle; and
    periodically updating said parameters based on a current operation of said automatic license plate recognition engine and historical statistics associated with said automatic license plate recognition engine.

2. The method of claim 1 further comprising:
    decoding said machine-readable code to determine said parameter set including said parameters;
    encoding said machine-readable code with information based on a hierarchy having hierarchy levels with higher levels that are more robust to image noises and lower levels that are less robust with respect to said image noises and which contain more details at said lower levels; and
    arranging said hierarchy with augmented data at a highest level in said hierarchy such that said higher levels and said lower levels further define said parameters that drive said processing within said automatic license plate recognition engine to produce said recognition results thereof and enhance a machine readability of said license plate recognized and analyzed via said automatic license plate recognition engine.

3. The method of claim 2 wherein said machine readable code is encoded with information based on known failure modes of said automatic license plate recognition engine.

4. The method of claim 3 wherein said parameters include data indicative of whether or not said license plate contains a potential for misreading due to confusing characters.

5. The method of claim 3 wherein said parameters include data indicative of whether or not said license plate comprises a standard plate or a non-standard plate.

6. The method of claim 5 wherein said parameters include data indicative of whether said license plate contains characters subject to plate frame occlusion.

7. The method of claim 6 wherein said parameters include data indicative of said state jurisdiction.

8. The method of claim 7 wherein said parameters include data indicative of whether or not said license plate possesses a logo.

9. The method of claim 8 wherein said parameters include data indicative of whether the license plate has stacked characters or not.

10. The method of claim 8 wherein said parameters include data indicative of a particular font utilized by said license plate.

11. The method of claim 8 wherein said parameters include data indicative of optimal RGB-to-Gray mapping.

12. The method of claim 11 wherein said parameters include data indicative of the number of characters on said license plate.

13. The method of claim 12 wherein said parameters include data indicative of whether each character on said license plate is a letter or a number.

14. A system for data augmentation utilized in an automatic license plate recognition engine, said system comprising:
    at least one camera that communicates electronically with at least one illuminator and at least one trigger;
    an automatic license plate recognition engine that reads and recognizes an image of a license plate of a vehicle captured via said at least one camera and which communicates with a barcode reading engine, an image capture engine;
    at least one processor that communicates electronically with said at least one camera, said at least one illuminator and said at least one trigger;
    a data bus coupled to said at least one processor; and
    a computer-usable medium embodying computer program code, said computer-usable medium being coupled to said data bus, said computer program code comprising instructions executable by said at least one processor and configured for:
        associating a machine-readable code with said automatic license plate recognition engine to read and recognize said image of said license plate of said vehicle captured via said at least one camera and which communicates with said barcode reading engine, said image capture engine and said at least one processor to communicate electronically with said at least one camera, said at least one illuminator and said at least one trigger;
        controlling said at least one trigger, said at least one illuminator and said at least one camera via said image capture engine so that said at least one trigger controls said at least one illuminator to illuminate a license plate region of said vehicle;
        configuring said machine-readable code to comprise 24 or fewer bits, which define parameters that drive processing within said automatic license plate recognition engine with respect to said at least one processor to produce recognition results thereof and enhance a machine readability of said image of said license plate captured by said at least one camera and recognized and analyzed via said automatic license plate recognition engine;

locating a barcode region in said image of said license plate via said barcode reading engine using a priori knowledge of said location and edge references and known pixel-to-edge distance relationships to determine a parameter set from said parameters, which is sent to said license plate reading engine, which uses said parameter set to determine a correct character sequence and a state jurisdiction to determine a unique identifier for said vehicle; and periodically updating said parameters based on a current operation of said automatic license plate recognition engine and historical statistics associated with said automatic license plate recognition engine.

15. The system of claim 14 wherein said instructions are further configured for:

decoding said machine-readable code to determine said parameter set including said parameters;

encoding said machine-readable code with information based on a hierarchy having hierarchy levels with higher levels that are more robust to image noises and lower levels that are less robust with respect to said image noises and which contain more details at said lower levels; and arranging said hierarchy with augmented data at a highest level in said hierarchy such that said higher levels and said lower levels further define said parameters that drive said processing within said automatic license plate recognition engine to produce said recognition results thereof and enhance a machine readability of said license plate recognized and analyzed via said automatic license plate recognition engine.

16. The system of claim 15 wherein said machine readable code is encoded with information based on known failure modes of said automatic license plate recognition engine.

17. The system of claim 16 wherein said parameters include data indicative of:

whether or not said license plate contains a potential for misreading due to confusing characters;

whether or not said license plate comprises a standard plate or a non-standard plate; and whether said license plate contains characters subject to plate frame occlusion.

18. The system of claim 17 wherein said parameters further include data indicative of:

said state jurisdiction;

optimal RGB-to-Gray mapping;

the number of characters on said license plate;

whether each character on said license plate is a letter or a number;

whether or not said license plate possesses a logo;

whether said license plate includes stacked characters; and a particular font utilized by said license plate.

19. A system for data augmentation utilized in an automatic license plate recognition engine, said system comprising at least one camera that communicates electronically with at least one illuminator and at least one trigger;

an automatic license plate recognition engine that reads and recognizes an image of a license plate of a vehicle captured via said at least one camera and which communicates with a barcode reading engine and an image capture engine;

at least one processor that communicates electronically with said at least one camera, said at least one illuminator and said at least one trigger, wherein said automatic license plate recognition engine reads and recognizes said image of said license plate of said vehicle captured via said at least one camera and which communicates with said barcode reading engine, said image capture engine and said at least one processor to communicate electronically with said at least one camera, said at least one illuminator and said at least one least one trigger, wherein said at least one trigger controls said at least one illuminator to illuminate a license plate region of said vehicle;

wherein parameters comprising 24 or fewer bits are defined, which drive processing with respect to said at least one processor to produce recognition results thereof and enhance a machine readability of said image of said license plate captured by said at least one camera and recognized and analyzed via said automatic license plate recognition engine;

wherein a barcode region in said image of said license plate is located via said barcode reading engine using a priori knowledge of said location and edge references and known pixel-to-edge distance relationships to determine a parameter set from said parameters, which is sent to said license plate reading engine, which uses said parameter set to determine a correct character sequence and a state jurisdiction to determine a unique identifier for said vehicle; and wherein said parameters are periodically updated based on a current operation of said automatic license plate recognition engine and historical statistics associated with said automatic license plate recognition engine.

20. The system of claim 19 wherein said at least one processor uses augmented data in a hierarchy having hierarchy levels with higher levels that are more robust to image noises and lower levels that are less robust with respect to said image noises and which contain more details at said lower levels and wherein said hierarchy is arranged with said augmented data at a highest level in said hierarchy such that said higher levels and said lower levels further define said parameters that drive said processing within said automatic license plate recognition engine to produce said recognition results thereof and enhance a machine readability of said license plate recognized and analyzed via said automatic license plate recognition engine and wherein said augmented data comprises an augmentation data bit format that encodes extra information used to improve the performance of said automatic license plate recognition engine.

* * * * *